Patented Nov. 22, 1927.

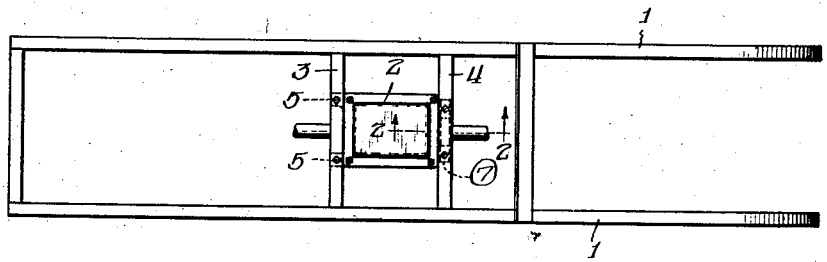
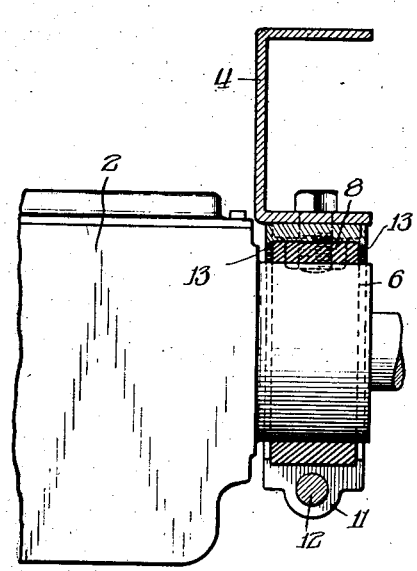
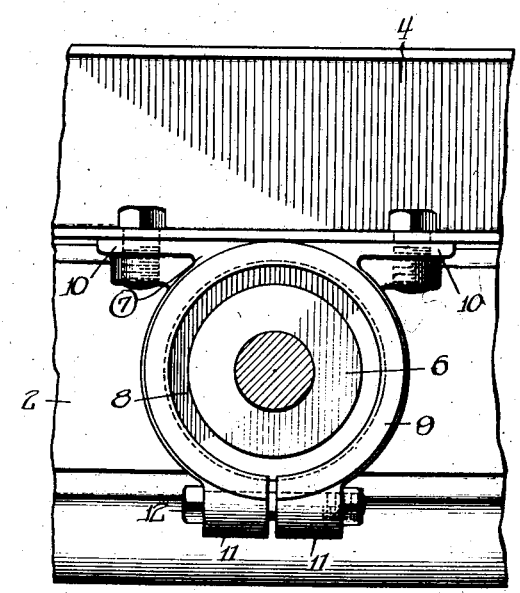

1,650,045

UNITED STATES PATENT OFFICE.

JOHN RIISE, OF DOYLESTOWN, OHIO.

SHOCK INSULATOR.

Application filed September 21, 1925. Serial No. 57,620.

The present invention relates to shock insulators.

More particularly the present invention relates to means for insulating or absorbing the shocks which occur between the transmission mechanism and the frame of an automobile. The supporting means for mounting the transmission box of an automobile upon the frame thereof will wear due to the vibration encountered in service and will become noisy. Even before wear has occurred, the metal-to-metal contact will produce squeaks due to twists in the frame and corresponding relative motion between the surfaces of the supporting and supported parts.

An object of the present invention is to provide a construction in which the noises above referred to are avoided.

A further object is to provide a support adapted to hold the transmission casing of an automobile, which support is simple in construction and which will effectually absorb the shocks encountered in service.

Further objects will appear as the description proceeds.

Referring to the drawings—

Figure 1 is a more or less diagrammatic plan view of an automobile frame having a transmission box mounted thereon;

Figure 2 is a fragmentary view on line 2—2 of Figure 1, on an enlarged scale, of part of the frame of an automobile, the transmission casing and the supporting means embodying the present invention; and Figure 3 is a view taken at right angles to the view shown in Figure 2.

The numerals 1—1 indicate the side frame members of the chassis of an automobile. The numeral 2 indicates a transmission casing, which is supported by the two cross bars 3 and 4, which cross bars are supported by the side frame members 1—1.

The transmission casing of an automobile is commonly supported from three points, and the present invention contemplates such a suspension, one extremity of the transmission casing being united to the cross bar 3 at the two points 5—5. For supporting the other extremity of the transmission casing a special construction is provided, which will now be described.

Referring particularly to Figures 2 and 3, it will be noted that the transmission casing 2 has an axially projecting portion 6, which is substantially circular in cross section. Said projecting portion 6 is supported from the cross bar 4 by means of the bracket 7 and the ring member 8. Said ring member 8 will be composed of rubber or other cushioning material and will absorb shocks between the cross bar 4 and the transmission casing 2 and prevent squeaks, which are frequently set up by reason of vibration between the transmission casing and its supporting member.

The bracket 7 comprises a radially split ring portion 9 and the outstanding lugs 10—10, which lugs 10—10 may be bolted to the cross bar 4. The two extremities of the split ring 9 are provided with the bosses 11—11, which bosses provide seats through which pressure may be exerted upon the ring 8 by means of the bolt 12. The split ring 9 is provided with the inwardly extending flanges 13—13, which flanges are adapted to engage the two sides of the ring member 8 for holding said member 8 in proper position within said split ring 9 and for the further purpose of limiting the region of flow of the ring member 8 when said ring member is put into a state of compression.

In service the ring 8 will flow under shock, the extent of flow being restricted by means of the flanges 13—13.

By reason of the present invention a simple structure is provided which effectually reduces noise and wear due to vibration. It will be clear that either extremity of the transmission casing may be provided with the cushioning means above described. It will also be clear that many modifications over the described embodiment of the present invention will occur to those skilled in the art. It is intended to cover all such modifications that fall within the scope of the appended claims.

What is claimed is:

1. In combination, the frame of an automobile, a pair of cross bars carried by said frame, a casing, means for connecting one extremity of said casing to one of said bars, and means for supporting the other extremity of said casing to the other of said bars, said means including a cushioning ring, an adjustable unitary split ring encircling said cushioning ring, means for supporting said split ring from said other bar, and means for adjusting the pressure of said split ring upon said cushioning ring, said split ring being provided with flanges at the extremities of said cushioning ring for limiting the flow of said cushioning ring.

2. In combination, a part of an automobile, a casing, means for connecting said casing to said automobile, said connecting means including a cushioning ring enclosing a portion of said casing and an adjustable unitary split ring for holding said cushioning ring, said split ring being fastened to said automobile, said split ring being provided with a pair of flanges for limiting the flow of said cushioning ring under shock and means for adjusting the pressure of said split ring on said cushioning ring.

Signed at Doylestown, Ohio, this 17th day of September, 1925.

JOHN RIISE.